(12) United States Patent
Chau

(10) Patent No.: US 8,278,816 B2
(45) Date of Patent: Oct. 2, 2012

(54) HIGH CRI ELECTROLUMINESCENT LAMP

(75) Inventor: Chung-nin Chau, Athens, PA (US)

(73) Assignee: Global Tungsten & Powders Corp., Towanda, PA (US)

( * ) Notice: Subject to any disclaimer, the term of this patent is extended or adjusted under 35 U.S.C. 154(b) by 1174 days.

(21) Appl. No.: 10/711,682

(22) Filed: Sep. 30, 2004

(65) Prior Publication Data

US 2006/0066209 A1    Mar. 30, 2006

(51) Int. Cl.
*H01J 1/62*         (2006.01)
*H01J 63/04*        (2006.01)
*C09K 11/08*        (2006.01)
*C09K 11/66*        (2006.01)
*C09K 11/54*        (2006.01)
*C09K 11/56*        (2006.01)
*C09K 11/70*        (2006.01)
*C09K 11/72*        (2006.01)
*C09K 11/77*        (2006.01)

(52) U.S. Cl. ........... 313/503; 252/301.4 F; 252/301.6 R; 252/301.6 S; 252/301.6 F

(58) Field of Classification Search ............ 252/301.4 F, 252/301.6 R, 301.6 S, 301.6 F; 313/503
See application file for complete search history.

(56) References Cited

U.S. PATENT DOCUMENTS

| | | | |
|---|---|---|---|
| 5,009,808 A | 4/1991 | Reilly et al. | |
| 5,156,885 A | 10/1992 | Budd | |
| 5,220,243 A | 6/1993 | Klinedinst et al. | |
| 5,244,750 A | 9/1993 | Reilly et al. | |
| 5,643,496 A * | 7/1997 | Brese et al. | 252/301.6 S |
| 5,702,643 A | 12/1997 | Reddy et al. | |
| 5,711,898 A | 1/1998 | Reddy et al. | 252/301.65 |
| 6,064,150 A | 5/2000 | Klinedinst et al. | |
| 6,090,311 A | 7/2000 | Brese et al. | |
| 6,153,123 A | 11/2000 | Hampden-Smith et al. | 252/301.45 |
| 6,309,700 B1 | 10/2001 | Fan et al. | |
| 6,580,224 B2 * | 6/2003 | Ishii et al. | 315/169.3 |
| 6,649,946 B2 | 11/2003 | Bogner et al. | |
| 6,682,663 B2 | 1/2004 | Botty et al. | |
| 7,452,483 B2 | 11/2008 | Belinski-Wolfe et al. | 252/301.4 S |
| 7,749,405 B2 | 7/2010 | Belinski-Wolfe et al. | 252/301.4 S |
| 2001/0008363 A1 | 7/2001 | Sanghera et al. | 313/496 |
| 2003/0020101 A1* | 1/2003 | Bogner et al. | 257/233 |
| 2004/0135504 A1 | 7/2004 | Tamaki et al. | 313/512 |
| 2004/0227705 A1 | 11/2004 | Fujimoto et al. | 345/76 |
| 2005/0156496 A1 | 7/2005 | Takashima et al. | 313/237 |
| 2006/0066209 A1 | 3/2006 | Chau | 313/486 |

FOREIGN PATENT DOCUMENTS

| | | |
|---|---|---|
| CA | 2511250 | 6/2005 |
| CN | 1340590 A | 3/2002 |
| CN | 2005/0107656.4 | 9/2005 |
| EP | 1 001 660 | 5/2000 |
| EP | 1 104 799 A | 6/2001 |
| EP | 1 371 711 A2 | 12/2003 |
| EP | 1 433 831 A | 6/2004 |
| EP | 1 447 854 A | 8/2004 |
| EP | 05019930.6 | 9/2005 |
| EP | 1605028 | 12/2005 |
| EP | 06019597.1 | 9/2006 |
| EP | 07011710.6 | 6/2007 |
| JP | 2001/302691 | 12/1989 |
| JP | 2002-62530 | 2/2002 |
| JP | 2004-161808 | 6/2004 |
| JP | 2004-235598 | 8/2004 |
| JP | 2005 146190 A | 6/2005 |
| JP | 2005-281971 | 9/2005 |
| JP | 2007-196347 | 7/2007 |
| KR | 89861/2005 | 9/2005 |
| KR | 109891/2006 | 11/2006 |
| KR | 75834/2007 | 7/2007 |
| KR | 849786 | 7/2008 |
| TW | 096128274 | 8/2007 |
| WO | WO 00/33390 | 6/2000 |
| WO | WO01/40403 * | 6/2001 |
| WO | WO 01/40403 | 6/2001 |
| WO | WO 02/11173 | 2/2002 |
| WO | WO 2004/081140 | 9/2004 |
| WO | WO 2005/029596 | 3/2005 |

OTHER PUBLICATIONS

Lee et al. "Development and Luminescent Characteristics of CaSiN2 Based Phosphors" Journal of the Institute of Electronic Engineering of Korea, Oct. 1999 vol. 36D, No. 10 pp. 31-36.*
Wang. Effect of activator distribution on photo- and X-ray excited luminescence properties of ZnS:Cu,Cl phosphors. Materials Research Bulletin 43 (2008) 1892-1897.*
Bowers. Luminescent Centers in ZnS: Cu:Cl Phosphors. Physical Review. vol. 99, No. 6. Sep. 15, 1955.*
WO 03/080764 A1, front page only (Oct. 2, 2003).
Tanaka et al. "Electroluminescence Materials", Chapter 9, Section 2, Phosphor 1-24 Handbook, pp. 601-612.
05019930.6, Feb. 18, 2011, Examination Report.
European Official Communication dated Nov. 11, 2011, in European Patent Application No. 05 019 930.6.
Response to European Official Communication dated Mar. 20, 2012, in European Patent Application No. 05 019 930.6.

* cited by examiner

Primary Examiner — Carol M Koslow
Assistant Examiner — Matthew Hoban
(74) Attorney, Agent, or Firm — Ballard Spahr LLP

(57) ABSTRACT

An electroluminescent lamp having a high color rendering index (CRI) can be made using a phosphor blend comprising a mixture of an electroluminescent phosphor and an europium-activated alkaline earth silicon nitride phosphor, wherein the electroluminescent phosphor is selected from a blue-emitting electroluminescent phosphor, a blue-green-emitting electroluminescent phosphor, or a combination thereof. Preferably, the lamp exhibits a CRI of at least about 75, and, more preferably, at least about 80. A preferred blend contains from about 10% to about 20% by weight of the europium-activated alkaline earth silicon nitride phosphor.

16 Claims, 2 Drawing Sheets

HIGH CRI ELECTROLUMINESCENT LAMP

TECHNICAL FIELD

This invention generally relates to electroluminescent lamps and phosphors, and, more particularly, to electroluminescent lamps for generating white light.

BACKGROUND OF THE INVENTION

Electroluminescence (EL) is the emission of light under electric-field excitation. Based on this mechanism, EL lamps are finding an increasing number of applications in the field of flat panel displays due to the growing demand for consumer electronic products, e.g., cellular phones and portable computing devices. EL lamps also provide uniform light emission independent of viewing angle and they are insensitive to mechanical shock and vibration. They can be easily DC-driven at 1.5-9 volts by using inverters that generate AC voltages of about 100-300 V (peak-to-peak) at frequencies of 50 to 1000 Hz.

The two major EL lamp constructions are generally referred to as thin film and thick film. Thin-film EL lamps are made by depositing alternating thin layers of dielectric materials, phosphors and conductive oxides on a glass substrate using a vapor deposition technique such as CVD. Thick-film lamps are made by suspending powdered materials in resinous materials and then applying the materials in layers onto a plastic film using conventional screen printing techniques. Hence, the thick-film EL lamps can be thin, flexible and rugged thereby making them suitable for a wider range of lighting applications.

The phosphors available for thick-film EL lamps are primarily comprised of zinc sulfide that has been doped with various activators, e.g., Cu, Au, Ag, Mn, Br, I, and Cl. Examples of these phosphors are described in U.S. Pat. Nos. 5,009,808, 5,702,643, 6,090,311, and 5,643,496. Examples of commercial EL phosphors include: OSRAM SYLVANIA Type 813, a blue-emitting ZnS:Cu phosphor, OSRAM SYLVANIA Type 723, a blue-green emitting ZnS:Cu,Cl phosphor and OSRAM SYLVANIA Type 523, a yellow-orange emitting ZnS:Cu,Mn phosphor. Typically, the individual particles of the EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150.

For signage and backlighting involving multi-color informational displays, it is important to be able to generate a white light with a high color rendering index (CRI). However, the brightest electroluminescent phosphors emit primarily in the blue to green spectral region at wavelengths from about 400 nm to about 550 nm. This makes it difficult to obtain a high CRI, white emission with EL lamps especially since a satisfactory red-emitting electroluminescent phosphor for thick-film EL lamps has yet to be developed. At present, the two most prevalent white-emitting EL technologies involve (1) combining a blue-green emitting electroluminescent phosphor with a Rhodamine dye and (2) blending a blue-green-emitting electroluminescent phosphor with an orange-emitting ZnS:Cu,Mn electroluminescent phosphor. In the first case, the combination of the blue-green electroluminescent phosphor with the Rhodamine dye can produce a lamp which exhibits a CRI of about 79 and has an x color coordinate of about 0.27 and a y color coordinate of about 0.34. However, the Rhodamine dye gives the unlit lamp an undesirable pink color which makes it less desirable for signage applications. In the second case, the blended EL phosphors yield a CRI of only about 69 with an x color coordinate of about 0.34 and a y color coordinate of about 0.38. In addition, because two different EL phosphors are used, there can be problems with color shifts during the life of the lamp as the brightness of the phosphors degrade at different rates.

Chinese Patent Publication No. CN 1340590A describes mixing blue- and blue-green emitting EL phosphors with a cerium-activated yttrium aluminum garnet phosphor $Y_3Al_5O_{12}$:Ce, (YAG:Ce). The YAG:Ce phosphor is a photoluminescent phosphor that is excited by wavelengths emitted by the blue and blue-green EL phosphors. The yellow emission from the YAG:Ce phosphor together with the blue- or blue-green emission from the EL phosphor creates a white light. However, the white light emitted by this combination lacks a significant red component and as a result has a CRI of less than about 70.

SUMMARY OF THE INVENTION

It is an object of the invention to obviate the disadvantages of the prior art.

It is another object of the invention to provide a white-emitting electroluminescent lamp having a high CRI.

It has been found that a high CRI electroluminescent lamp may be produced by combining a blue- or blue-green emitting EL phosphor with an europium-activated alkaline earth silicon nitride phosphor. Preferably, the blue-emitting electroluminescent phosphor emits from about 400 nm to about 470 nm and the blue-green-emitting electroluminescent phosphor emits from about 470 nm to about 550 nm. The europium-activated alkaline earth silicon nitride phosphors are photoluminescent materials that are excited at wavelengths from about 200 nm to about 500 nm and emit in the yellow to red spectral region with emission maxima at wavelengths from about 600 nm to about 680 nm.

In one embodiment, the europium-activated alkaline earth silicon nitride phosphors may be represented by the formula, $M_xSi_yN_z$:Eu, wherein M is selected from Ca, Sr, and Ba and wherein $z=2x/3+4y/3$. Such alkaline-earth silicon nitride phosphors are described in U.S. Pat. Nos. 6,682,663 and 6,649,946 which are incorporated herein by reference. In a preferred embodiment, the alkaline-earth silicon nitride phosphor is represented by the formula, $M_2Si_5N_8$:Eu wherein M is selected from Ca, Sr, and Ba. A more preferred phosphor is $Ca_2Si_5N_8$:Eu. In another embodiment, the alkaline earth phosphor is represented by the formula, $MSi_7N_{10}$:Eu wherein M is selected from Ca, Sr, and Ba. Preferably, the Eu concentration ranges from 1 to 10 atomic % compared to the alkaline earth ion.

When combined together in an electroluminescent lamp, the emissions from the electroluminescent and photoluminescent phosphors combine to generate a white light having a high CRI. Preferably, the lamp exhibits a CRI of at least about 75. More preferably, the CRI is at least about 80. A preferred blend contains an electroluminescent phosphor and from about 10% to about 20% by weight of an europium-activated alkaline earth silicon nitride phosphor, wherein the electroluminescent phosphor is selected from a blue-emitting electroluminescent phosphor, a blue-green-emitting electroluminescent phosphor, or a mixture thereof.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
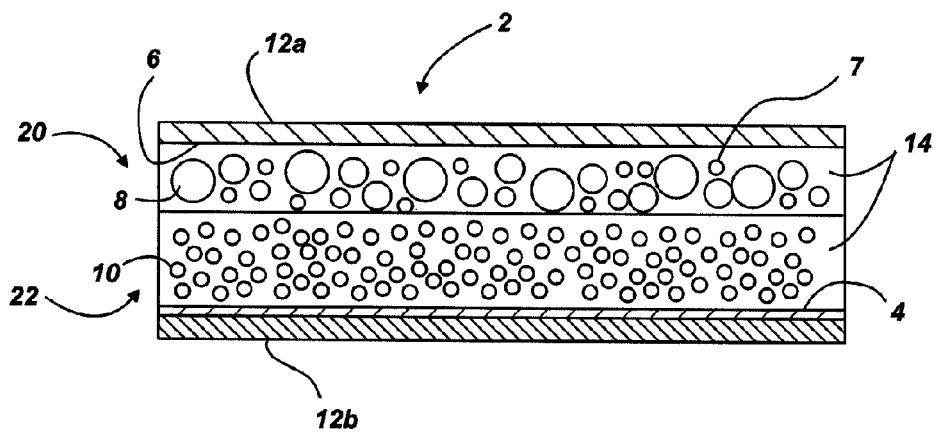
FIG. 1 is a cross-sectional illustration of a thick-film electroluminescent lamp according to this invention.

Referring to FIG. 1, there is shown a cross section of a thick-film electroluminescent lamp 2 according to this invention. The lamp 2 has two dielectric layers 20 and 22. A first conductive material 4, such as aluminum or graphite, coated on a plastic film 12b forms a first electrode of the lamp 2; while a thin layer of a transparent conductive material 6, such as indium tin oxide, coated on a second plastic film 12a forms a second electrode. Sandwiched between the two conductive electrodes 4 and 6 are two layers 20 and 22 of dielectric material 14 which can be, for example, cyanoethyl cellulose or cyanoethyl starch. Adjacent to the first electrode 4 is a layer of dielectric material 14 in which are embedded particles of a ferroelectric material 10, preferably barium titanate. Adjacent to the second electrode 6 is a layer of dielectric material 14 in which are embedded particles of the blue or blue-green emitting electroluminescent phosphor 8 and particles of an europium-activated alkaline earth silicon nitride phosphor 7.

Figure 2:
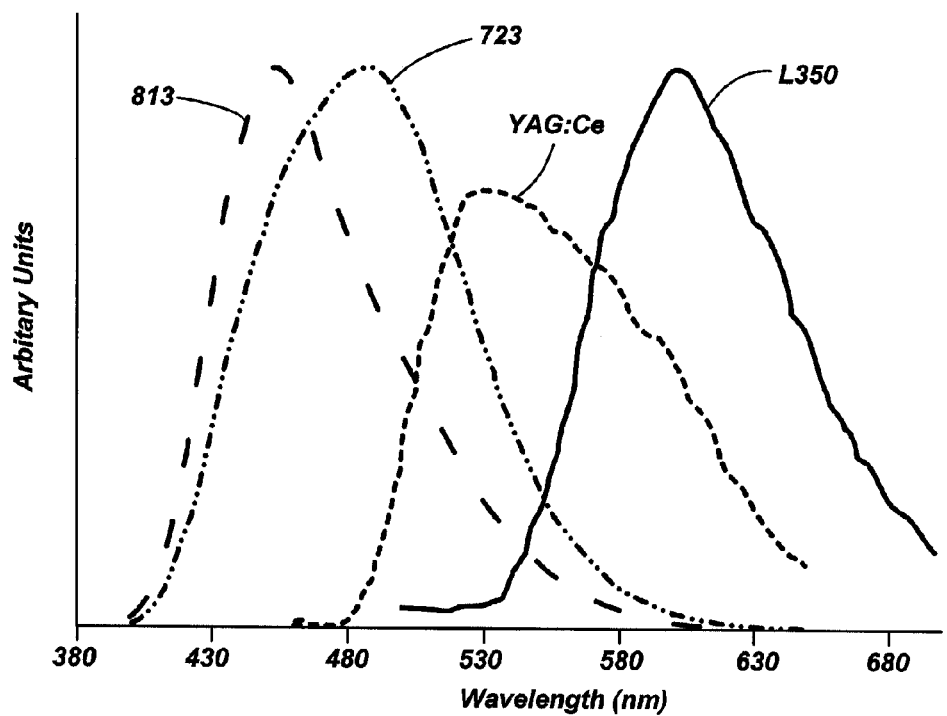
FIG. 2 is a comparison of the emission spectra of two electroluminescent phosphors, a YAG:Ce phosphor and a europium-activated alkaline earth silicon nitride phosphor.

The emission spectra of several phosphors are compared in FIG. 2: an OSRAM SYLVANIA Type 813 blue-emitting electroluminescent phosphor, an OSRAM SYLVANIA Type 723 blue-green-emitting electroluminescent phosphor, a cerium-activated yttrium aluminum garnet (YAG:Ce) phosphor and OSRAM Type L350 $Ca_2Si_5N_8$:Eu phosphor. The emission maximum of the $Ca_2Si_5N_8$:Eu phosphor occurs at about 600 nm which is significantly higher than the emission maximum of the YAG:Ce phosphor of about 530 nm. Moreover, the emission of the $Ca_2Si_5N_8$:Eu phosphor extends out to about 680 nm.

Electroluminescent lamps made to contain blends of the $Ca_2Si_5N_8$:Eu phosphor with the blue- and blue-green emitting electroluminescent phosphors may produce CRI values greater than about 75. Whereas, lamps made to contain blends of the same electroluminescent phosphors with YAG:Ce may only produce CRI values of less than 70. In particular, Table 1 provides the calculated ranges of CRI values which may be obtained from such combinations.

TABLE 1

| Phosphor Blend | CRI Range |
| --- | --- |
| Type 813 (ZnS:Cu) & Type L350 $Ca_2Si_5N_8$:Eu | 74 to 85 |
| Type 723 (ZnS:Cu, Cl) & Type L350 $Ca_2Si_5N_8$:Eu | 75 to 85 |
| Type 813 (ZnS:Cu) & YAG:Ce | 56 to 68 |
| Type 723 (ZnS:Cu, Cl) & YAG:Ce | 53 to 62 |

Figure 3:
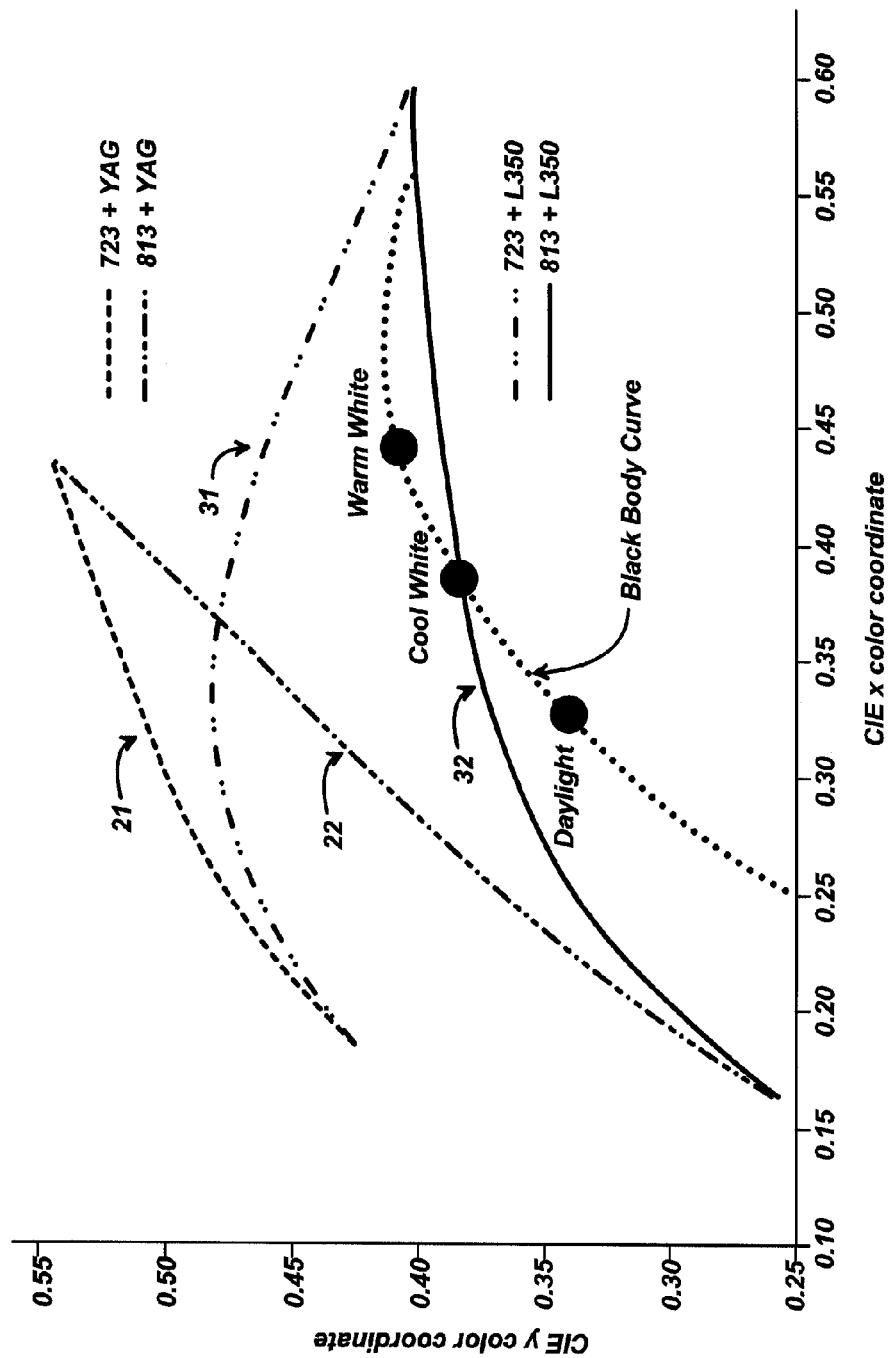
FIG. 3 is a CIE x,y chromaticity diagram which illustrates the color points obtainable by various phosphor combinations.

FIG. 3 shows the range of CIE x,y color coordinates achievable for blends of the blue- (813) and blue-green-emitting (723) electroluminescent phosphors with a YAG:Ce phosphor (curves 21 and 22, respectively) and a $Ca_2Si_5N_8$:Eu (L350) phosphor (curves 31 and 32, respectively). The curves for the blends with the L350 phosphor 31, 32 lie closer to the Black Body Curve than the corresponding curves for the blends containing the YAG:Ce phosphor 21, 22 and nearer the white color points for Daylight (0.333, 0.333), Cool White (0.380, 0.380), and Warm White (0.440, 0.400). (The x,y color coordinates referred to herein are for the 1931 Commission Internationale de l'Eclairage (CIE) Standard Observer (2°)).

A CRI of about 85 may be obtained with a blend containing about 10% to about 20% by weight of the L350 phosphor. The color coordinates for such a blend will range from about 0.29 to about 0.39 for the x value and from about 0.35 to about 0.39 for the y value. Table 2 compares data from several EL lamps made with blends containing 20% by weight of the electroluminescent phosphors, YAG:Ce (OSRAM SYLVANIA Type 251) and $Ca_2Si_5N_8$:Eu (L350).

TABLE 2

| Phosphor | Brightness (ft-L) | Efficacy (lumens/W) | x | y | CRI |
| --- | --- | --- | --- | --- | --- |
| 813 (control) | 20.3 | 2.92 | 0.170 | 0.250 | 30 |
| 813/251 | 17.8 | 3.19 | 0.217 | 0.345 | 55 |
| 813/L350 | 16.7 | 3.44 | 0.295 | 0.356 | 85 |
| 723 (control) | 31.9 | 4.18 | 0.188 | 0.423 | 40 |
| 723/L350 | 18.8 | 4.29 | 0.314 | 0.490 | 75 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. An electroluminescent lamp including a phosphor blend comprised of a mixture of an electroluminescent phosphor and an europium-activated alkaline earth silicon nitride phosphor, the electroluminescent phosphor selected from a blue-emitting electroluminescent phosphor, a blue-green-emitting electroluminescent phosphor, or a combination thereof.

2. The lamp of claim 1 wherein the europium-activated alkaline earth silicon nitride phosphor is represented by the formula, $M_xSi_yN_z$:Eu, wherein M is selected from Ca, Sr, and Ba and wherein z=2x/3+4y/3.

3. The lamp of claim 1 wherein the europium-activated alkaline earth silicon nitride phosphor is represented by the formula, $M_2Si_5N_8$:Eu wherein M is selected from Ca, Sr, and Ba.

4. The lamp of claim 1 wherein the europium-activated alkaline earth silicon nitride phosphor is represented by the formula, $MSi_7N_{10}$:Eu wherein M is selected from Ca, Sr, and Ba.

5. The lamp of claim 1 wherein the europium-activated alkaline earth silicon nitride phosphor is $Ca_2Si_5N_8$:Eu.

6. The lamp of claim 1 wherein the blend contains from about 10% to about 20% by weight of the europium-activated alkaline earth silicon nitride phosphor.

7. The lamp of claim 1 wherein the blue-emitting electroluminescent phosphor is ZnS:Cu and the blue-green-emitting electroluminescent phosphor is ZnS:Cu,Cl.

8. The lamp of claim 1 wherein the blue-emitting electroluminescent phosphor emits at a wavelength from about 400 nm to about 470 nm and the blue-green-emitting electroluminescent phosphor emits at a wavelength from about 470 nm to about 550 nm.

9. The lamp of claim 8 wherein the europium-activated alkaline earth silicon nitride phosphor is excited at a wavelength from about 200 nm to about 500 nm and exhibits an emission maximum at a wavelength from about 600 nm to about 680 nm.

10. The lamp of claim 1 wherein the lamp exhibits a CRI of at least about 75.

11. The lamp of claim 1 wherein the lamp exhibits a CRI of at least about 80.

12. The lamp of claim 5 wherein the lamp exhibits a CRI of about 85.

13. The lamp of claim 1 wherein the lamp exhibits an x color coordinate from about 0.29 to about 0.39 and a y color coordinate from about 0.35 to about 0.39.

14. The lamp of claim 13 wherein the blend contains from about 10% to about 20% by weight of the europium-activated alkaline earth silicon nitride phosphor.

15. The lamp of claim 14 wherein the europium-activated alkaline earth silicon nitride phosphor is $Ca_2Si_5N_8$:Eu.

16. The lamp of claim 2 wherein the europium concentration is from 1 to 10 atomic % compared to the alkaline earth ion.

* * * * *